United States Patent

[11] 3,548,695

| [72] | Inventor | Williams S. Pearson<br>Hampstead, Md. |
|---|---|---|
| [21] | Appl. No. | 731,584 |
| [22] | Filed | May 23, 1968 |
| [45] | Patented | Dec. 22, 1970 |
| [73] | Assignee | Cypro Incorporated<br>Hampstead, Md.<br>a corporation of Maryland. by mesne assignments |

[54] HIGH SPEED PLASTIC BOTTLE TAKE-OFF AND TRIMMING
20 Claims, 10 Drawing Figs.

[52] U.S. Cl............................................... 83/24,
18/5, 83/218, 83/236, 83/278, 83/914
[51] Int. Cl.................................................... B26d 7/06
[50] Field of Search............................................ 18/5BR,
5BP, 5BS; 264/150, 151, 99; 83/914, 218, 266,
278, 262, 268, 269, 23, 24, 27, 50, 52, 235, 236;
164/263, 278, 70

[56] References Cited

UNITED STATES PATENTS

| 2,721,612 | 1955 | Almgren...................... | 83/278X |
| 2,725,101 | 1955 | Von Hofe..................... | 83/278X |
| 3,172,152 | 1965 | Uhlig............................ | 18/5 |
| 3,228,086 | 1966 | Brown et. al.................. | 83/914x |
| 3,391,588 | 7/1968 | Brown........................... | 83/24 |

FOREIGN PATENTS

| 399,082 | 1964 | Japan........................... | 18/5 |

*Primary Examiner*—Andrew R. Juhasz
*Assistant Examiner*—James F. Coan
*Attorney*—Hill, Sherman, Meroni, Gross and Simpson ABSTRACT: A takeoff device timed with a plastic bottle blow-molding machine removes a continuous chainlike string of connected bottle blanks from the machine and supplies the string to a coordinately operating plastic bottle trimmer which successively trims the individual bottles from the string.

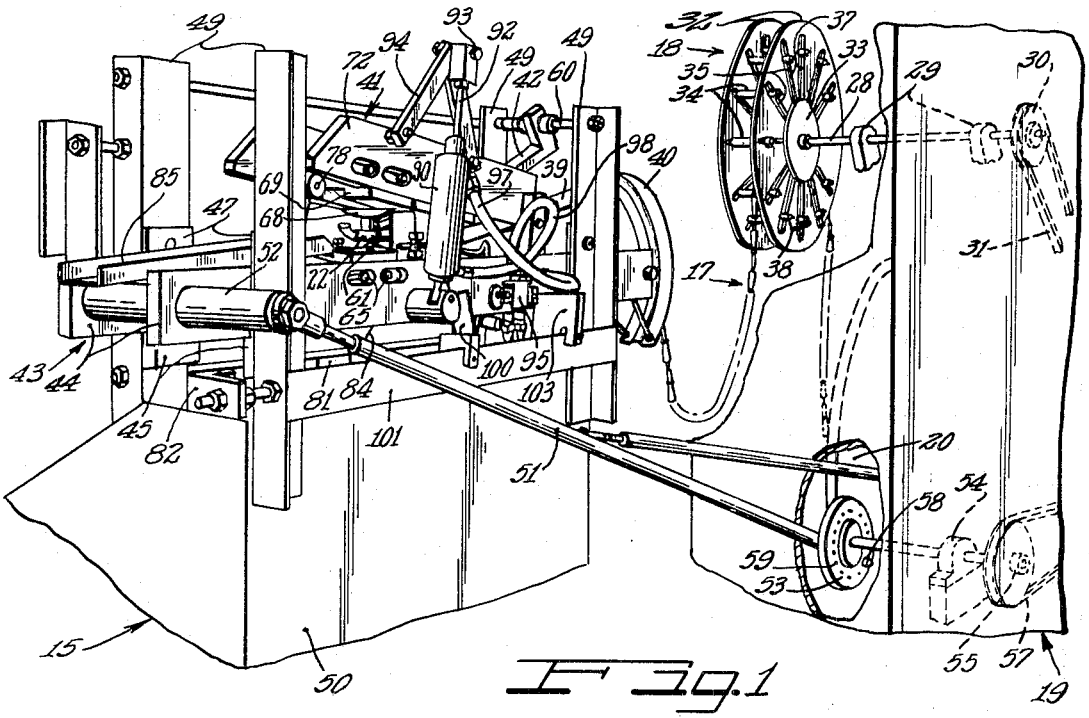

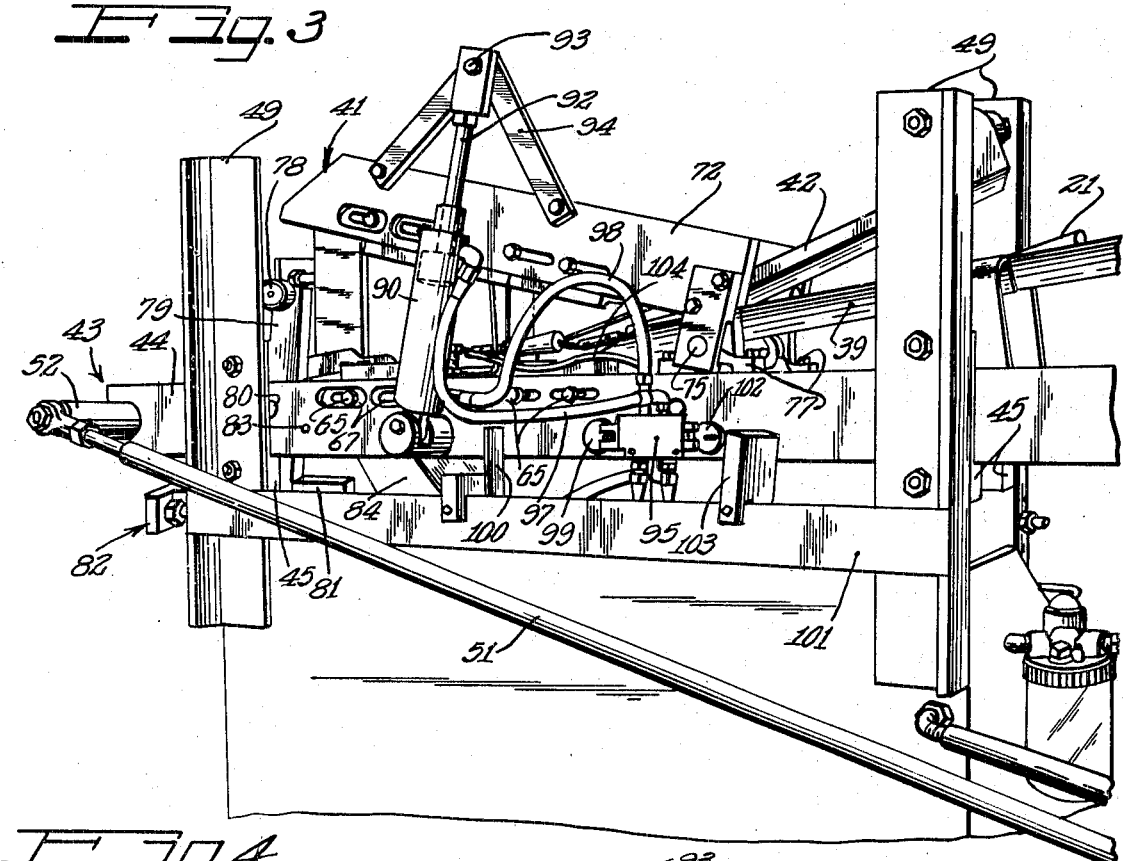

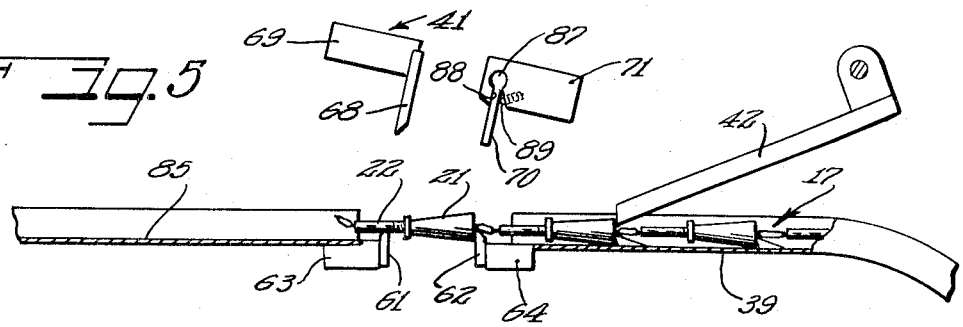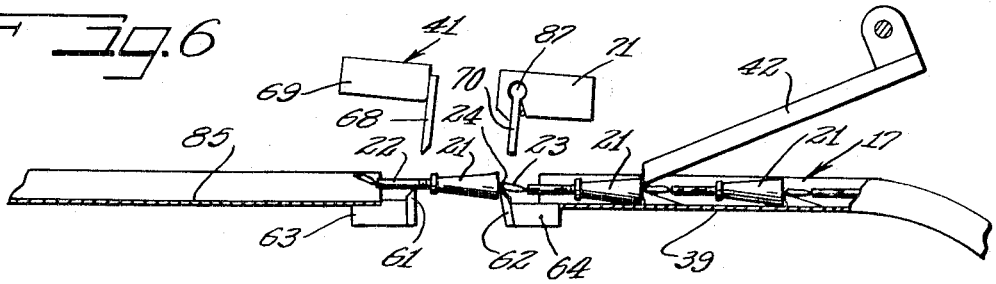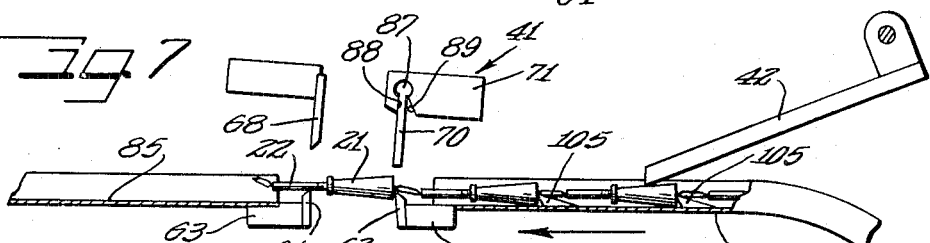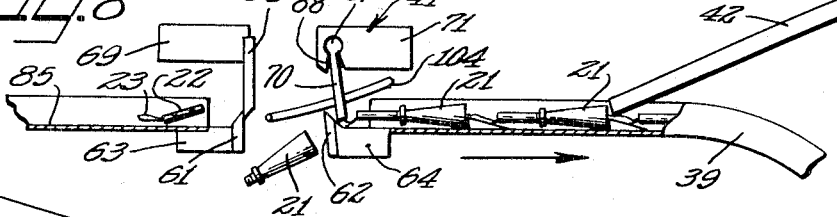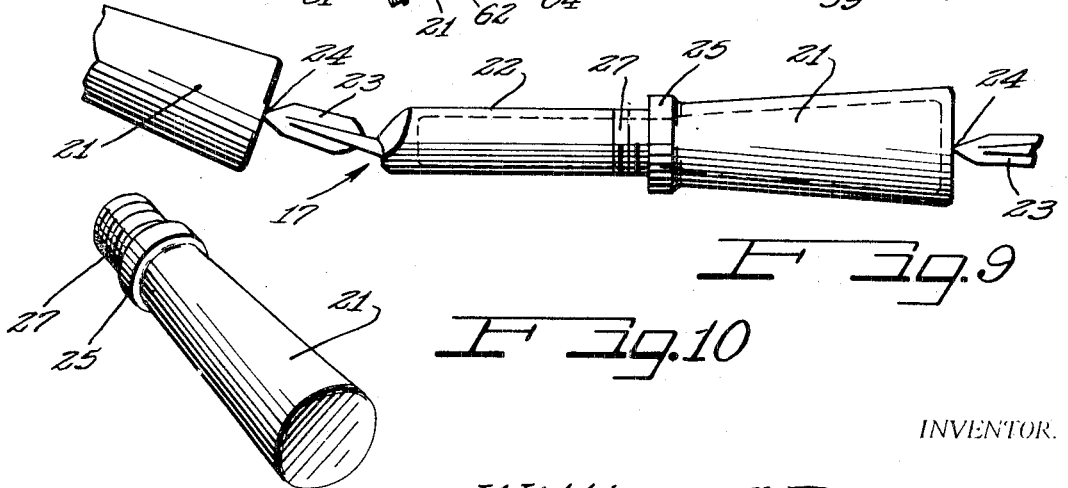

३,५४८,६९५

HIGH SPEED PLASTIC BOTTLE TAKE-OFF AND TRIMMING

This invention relates to apparatus taking off a continuous strip or string of plastic bottle units from a blow-molding machine and trimming the individual bottles from the string.

Bottles made from semirigid plastic materials, and more particularly thermoplastic synthetic materials of an evergrowing variety, are enjoying increasing use because of their numerous inherent and now well-known advantages and capabilities. Such bottles are commonly produced in a reasonably high speed blow molding machine. At least at one end of the bottle unit, a sprue or flash of residual material results from the blow molding process and this must be trimmed off after the bottle leaves the mold. On numerous varieties of bottles it is necessary after the bottle is removed from the mold to machine or at least trim-size in respect to cap-retaining means such as threads and lugs, opening dimensions mouth or nozzle configurations, and the like.

With some machines to produce this type of bottle it has heretofore been necessary to strip the individual bottles manually, which is a dangerous operation and has resulted in injury to the operator. Further, it is a relatively slow production procedure.

According to the present invention the foregoing and other disadvantages are overcome by the provision of novel means for automatically taking off from the molding machine a continuous string of molded bottles and automatically trimming the individual bottle units from the string so that they are immediately in condition to be finished by completing the desired configuration of the nozzle or mouth end of the bottle.

An important object of the invention is to effectuate the automatic takeoff and trimming of molded plastic bottles.

Another object of the invention is to provide improved apparatus for trimming molded plastic bottles produced in a continuous stringlike succession.

A further object of the invention is to provide a new and improved takeoff device for a continuous string plastic bottle molding machine.

Yet another object of the invention is to provide a new and improved apparatus for taking off a string of molded plastic bottles and trimming the individual bottles from the string.

It is also an object of the invention to provide a new and improved method of handling and trimming molded plastic bottles.

Other objects, features and advantages will be readily apparent from the following detailed description of a preferred embodiment thereof taken in conjunction with the accompanying drawings, in which:

FIG. 1 is a fragmentary perspective view of a takeoff and trimming apparatus and associated molding machine;

FIG. 2 is a side perspective view of the trimming machine;

FIG. 3 is another side perspective view of the trimming machine;

FIG. 4 is a further side perspective view of the trimming machine;

FIG. 5 to 8, inclusive, are schematic views illustrating the operation of the trimming mechanism of the trimming machine;

FIG. 9 is a side elevational view of a portion of a string of molded plastic bottles; and FIG. 10 is an isometric view of one of the trimmed bottles.

Illustrative of the present invention is a plastic bottle trimming machine 15 (FIG. 1) to which is supplied a string 17 of plastic bottles from a takeoff device 18 operatively related to a plastic bottle blow molding machine 19. Inasmuch as the blow molding machine 19, per se, is not a part of the present invention details thereof have been omitted from the drawings. In this machine a succession of dies carried by a rotary drum or wheel 20 operate continuously to produce hollow plastic blanks in the form of bottles 21 (FIG. 9) which, as they are released from the molds are connected in end-to-end relation by means of a hollow rodlike integral mouth end extension 22 on each of the bottle blanks attached by means of an integral ear flange 23 to the bottom end of the next successive bottle blank 21 at a flexible hinge joint 24. Contiguous to a collar 25 on the mouth end of the bottle body, the stem 22 may be provided with at least the basic configuration of cap-retaining lug means such as screw-on threads 27.

According to the present invention the bottle blanks in the string are automatically stripped from the molds of the wheel 20 by the takeoff device 18 which is desirably in the form of a wheel mounted at a suitable elevation above the mold wheel 20 on a rotary shaft 28 mounted on suitable bearings 29 and driven by means such as a sprocket gear or pulley 30 over which is trained a driven flexible driving element 31 such as a sprocket chain or drive belt, as the case may be. Takeoff rotation of the wheel 18 is timed with operation of the molding wheel 20 to effect stripping of each successively formed bottle blank in the strip 17 as released from its mold.

Operation of the takeoff wheel 18 is on the order of a sprocket wheel coacting with the bottle blanks in the strip 17 on the order of links in a chain. For this purpose, the takeoff wheel device 18 comprises a pair of spaced coaxial discs 32 mounted in rigid corotative relation on a hub structure 33 attached corotatively to the shaft 28.

Means are provided between the wheel plates 32 for advancingly engaging the successive bottle blanks 21 in the strip 17, and more particularly to engage with the substantial area shoulders provided by the bottom ends of the bottle blanks. For this purpose an equally circumferentially spaced series of transverse propelling bars 34 is provided. The spacing between the bars 34 is correlated with the distance between the base end shoulders of the bottle blanks in the strip, so that by festooning the strip over the bars will thrust against the bottom end or base shoulders of the bottle blanks and advance the strip upwardly away from the molding machine wheel 20 on the upmoving side of the takeoff wheel 18, and downwardly on the down side of the takeoff wheel. In order to enable adjustment of the spacing between the bars 34 to accommodate bottles of different lengths or sizes, the bars 34 have their opposite end portions mounted in radially slidably adjustable relation in radial adjustment slots 35, having parallel sides 34 extending from near the hub 33 to adjacent the perimeter of each of the wheel plates. Securing screws 38 fasten the bars in the desired adjusted positions.

On leaving the takeoff wheel 18, the string 17 of bottle blanks feed into the trimming machine 15 where the individual blanks are separated from the strip with the blanks discharged for further processing, and the scrap derived from the trimmed off connecting means discharged for reuse. To this end, the string of bottle blanks is fed from the takeoff wheel 18 into a forwardly and downwardly oblique feed trough 39 in the trimming machine 15. Desirably a substantial slack loop of the bottle string 17 is permitted to intervene between the takeoff wheel 18 and the trough 39 so as to avoid any interference with timed coordination of the takeoff wheels with the molding machine during intermittent advances of the string in the trimming machine, and for this purpose an arcuate lead in track 40 extends upwardly to the entrance into the trough 39.

In the feed trough 39, the string of bottle blanks is conducted downwardly and forwardly into registration with a trimming die assembly 41. Feeding of the strip by bottle blank increments into the trimming die assembly is effected in a simple and efficient manner by means of a gravity biased pawl 42 relative to which the trough 39 and the trimming die assembly 41 are cyclically reciprocably moved on a horizontally elongated carriage 43. In a desirable construction, the carriage 43 comprises a pair of spaced parallel coextensive elongated heavy side frame bars 44 suitably rigidly connected in quadrangular relationship and supported slideably on greased block bearings 45 having cheek plates 47 and secured fixedly as by means of bolts 48 to the inside faces of respective spaced parallel coextensive upright front and rear pairs of frame beams 49 suitably fixedly mounted on a supporting stand or base 50 as by means of welding. Reciprocations of the carriage 43 are effected in suitably timed relation to operation of the molding machine 19 and the takeoff device 18 by means such as a driving link 51 pivotally attached to a stud 52 on the front end portion of the carriage and adjustably pivotally attached at its opposite end to a driving crank 53 rotatably supported on a shaft 54 associated with the molding machine 19 and driven by means such as a sprocket or pulley 55 over which is trained a flexible endless driving element 57 motivated by the power source for the molding machine. If preferred, of course, a gear drive, clutch, or the like may be employed as is common for this type of drive. In order to adjust the throw of the driving link 51 to accommodate the various sizes of bottles to be trimmed in the machine 15, connecting pivot means 58 for the link to the crank disc 53 are adapted to be secured in selective bearing holes 59 through the disc and located at different respective radial distance from the rotary axis of the disc.

In each reciprocal cycle of the carriage 43, the bottle strip advancing pawl 42 functions to advance a bottle blank 21 in the strip into proper registration for trimming in the trimming die assembly 41, and the trimming die assembly operates in coordinated relation to trim out the registered bottle blank and to resume a ready condition from the trimming condition of the assembly. For this purpose, the pawl 42 is pivotally mounted at its upper rear end portion on a transverse shaft 60 supported on the upper portions of the rear frame bars 49. From its pivotal suspension, the pawl extends at a suitable differential downward and forward angle and to a sufficient length to enable its free end tip to enter into engagement with the penultimate bottle blank 21 in the strip supported in the trough 39 (FIGS. 1, 4 and 6). By having the pawl 42 of sufficient weight, gravity bias alone may be sufficient to maintain contact of the advancing tip of the pawl with the bottle blanks, but if for any reason additional bias is needed spring means may be employed as is common with pawl structures. If, due to rapid reciprocable operation of the carriage there might be some danger of skipping by the pawl due to bouncing deflection, any suitable restraining device which will limit upward swinging of the pawl beyond a desirable limit may be provided.

At the end of the rearward or return stroke of the carriage 43 in its operating cycle, the pawl will have caused the bottle blank strip to have advanced in the trough 39 such that the leading bottle blank 21 is in position to be trimmed by the die assembly 41. More particularly, as best visualized in FIG. 6, the leading or terminal bottle blank 21 now lies in bridging relation between a forward upstanding shear blade 61 which has its edge in supporting engagement with the stem 22, and a rear upstanding shear blade 62 which has its edge in supporting engagement with the hinge connection 24 at the base of terminal bottle blank. Support of the shear blades 61 and 62 is on respective carrying blocks 63 and 64 which are mounted on and between the carriage bars 44 in a manner to be readily adjustable longitudinally on the carriage to enable setting the same to trim bottles of various lengths. For this purpose bolts 65 extending through respective longitudinal adjustment slots 67 in the bars 44 may be employed to advantage.

Trimming occurs in the forward or projection stroke of the carriage 43. To this end, the die assembly 41 includes a downwardly extending forward shear blade 68 which is operatively coactive with the forward lower shear blade 61 and is mounted on a carrying block 69. An upper rear downwardly extending shear blade 70 mounted on a carrying block 71 is operatively coactive with the lower rear shear blade 62. For raising the shear blades 68 and 70 to receive the successive bottle blanks to be trimmed in the die assembly, to guide the upper shear blades into shearing coaction with the lower shear blades, and to provide sufficient acceleration in the shearing stroke to overcome any problem of raggedness in the trim due to molecular elongation of the plastic bottle material during shearing, a shear head 72 of substantial mass is provided into which the carrying blocks 69 and 71 are secured in a manner to enable spacing adjustments of the shear blades 68 and 70 and cooperatively relative to the lower shear blades 61 and 62, securing bolts 73 extending through longitudinal adjustment slots 74 in the frame of the head 72 being employed for the purpose.

By having the shear head 72 of sufficient weight, free fall shearing action thereof might suffice. Accordingly the head 72 is pivotally mounted at its rear end by means of pivots 75 on respective journal blocks 77 mounted fixedly on the carriage bars 44 at opposite sides of and in clearance relation to the trough 39 which is mounted along a vertical longitudinal median plane on the carriage. At least at its rear end portion, the head 72 provides for clearance therethrough of the pawl 42. At its front end, the head 72 is supported in a ready, gravitationally free position on an antifriction roller 78 mounted on the upper end portion of a trip arm 79 which is rockably mounted by means of a pivot 80 on one of the carriage frame bars 44 with a lower end portion of the arm extending substantially below the carriage. In the retracted position of the carriage 43, the trip arm 79 is cocked by suitable means such as a spring or setting stop block 81 on the machine frame against which the lower end of the arm thrusts. Thereby the arm is tilted slightly rearwardly under the front end of the head 72 to receive the same on the roller 78 (FIGS. 1 and 4). As the carriage 43 reaches the forward limit of its operating stroke, the trip arm 79 is tripped away from the head 72 by the impingement of the lower end of the arm against a trip stop 82 mounted on the front end portion of the machine frame (FIG. 2). This frees the head 72 to drop suddenly to effect trimming of the leading bottle blank from the strip. Overrunning of the trip arm 79 in either direction is avoided by suitable means such as properly placed limit pins or stops 83 on the carriage bar 44 adjacent to which the arm is mounted.

Upon release from the arm 79, the shearing head 72 drops instantaneously and with accelerating momentum to carry the upper shearing blades 68 and 70 into shearing coaction with the complementary lower shearing blades 61 and 64, with abrupt and positive shearing impact against respectively the rod extension 22 and the relatively thin hinge connection 24, desirably as nearly coincidentally and as practicable although one may lag the other slightly for special purposes if desired. By having the taper of the shearing edge of the upper blade 68 toward its inner side and the edge moving shearingly along the inner side of the blade 61, the blade 68 acts, in this instance, as a downward deflector on the nozzle end of the trimmed bottle 21 to effect positive deflection downwardly through the gap between the lower shear blade 61 and 62 into a discharge chute 84. The trimmed off stem and hinge flange extension drops into a scrap trough 85. Clean trimming of the thin hinge joint 24 from the base of the bottle blank results from a cutting edge along the front of the upper shearing blade 70 coacting with a rearwardly tapered upper cutting edge of the lower shear blade 62 and with the upper shear blade 70 swingably deflecting along the taper clear of the trimmed bottle, as shown in FIG. 8. Swingable deflection of the blade 70 after shearing is enabled by hingedly mounting a pivot head 87 thereon in a complementary generally keyhole shaped slot 88 opening downwardly in the carrying block 71 and with the blade normally biased as by means of a spring 89 toward the front wall of the slot which is the shearing position of the blade, clearance being provided between the rear of the blade and the rear wall of the slot for rearward deflection of the blade in engagement with the cam surface at the rear side of the shearing edge of the lower blade 62.

For high speed operation, means are preferrably provided to boost the shearing drop or closing of the shearing head 72. While such shearing boost may be effected by means such as a solenoid, spring-loading mechanical device, and the like, a pneumatic booster is desirably employed. To this end, a rectilinear pneumatic actuator 90 is provided having a cylinder which extends upwardly from a pivotal mounting 92 on the outer side of one of the carriage bars 44 and has projecting from its upper end a piston rod 92 having a pivotal connection 93 with a connecting frame 94 secured to the head 72 intermediate its ends and preferrably in general alignment with the shearing dies. In addition to its shearing booster function, the actuator 90 serves as a shearing die opener, that is, to swing the shearing head 72 upwardly into open position after a trimming operation so that the trip arm 79 can be reset.

Operation of the pneumatic actuator 90 is controlled by a valve 95 connected to a suitable source of compressed air and having supply conduits 97 and 98 connecting it to respectively the upper end and the lower end of the working chamber within the cylinder. At terminus of the outward, trimming stroke of the carriage 43, a valve trip 99 strikes a top 100 (FIG. 2), mounted on a longitudinal carrying bar 101 on the machine frame, which operates the valve 95 to supply compressed air through the conduit 98 to the underside of the actuator piston whereby to effect raising of the shear head 72 (FIGS. 3 and 5) to a higher elevation than the trip arm 79. The head 72 is held in the open position by the actuator 90 until the carriage 43 reaches its rearmost position in its cycle, at which time the stop 81 swings the trip arm 79 into its shear-head supporting position, and a rearward valve actuator 102 strikes a rear trip stop 103 mounted on the bar 101 to reverse the valve. This causes compressed air to be shut off from the duct 98 and to open the same to atmosphere while pneumatic fluid is supplied through the duct 97 to the top of the actuator cylinder and to drive its piston to return the shear head 72 into supported relation on the trip arm 79. This compressed air charge through the conduit 97 is maintained until in the forward stroke of the carriage 43 the trip arm 79 is tripped to release the shear head 72, whereupon the pneumatic downthrust load applied by the actuator 90 snaps the shearing head 41 into the closed, shearing position. Exhaust air is desirably conducted from the valve 95 by an exhaust conduit 104 which has its outlet directed in discharge direction from adjacent to the receiving end of the scrap trough 85 to impel scrap toward the discharge end of this trough.

In each forward stroke of the carriage 43, the string of bottle blanks 21 is advanced one complete bottle unit, inclusive of stem extension and hinge flange, forwardly relative to the pawl 42 which easily slides over the next succeeding bottle blank during such movement of the carriage. In addition to holding of the string of blanks afforded by the engagement of the lower rear shear blade 62 with the foremost bottle blank base end shoulder, the feed trough 39 is desirably provided with fixed cam detents 105 located at properly spaced intervals longitudinally along the bottom of the trough to engage behind one or more of the bottle blanks in the trough to hold the string against rearward displacement while the trough is moving forward with the carriage and the pawl 42 is dragging over the next succeeding blank (FIG. 7) into position therebehind (FIG. 8) as the trimming die completes its trimming action. Then, during the return stroke of the carriage, the pawl 42 holds the engaged bottle blank and causes the leading bottle blank to cam over the rear lower shear blade 62 into registration with the shear blades. This mode of advancing the bottle blanks accomplishes the result with minimum expenditure of energy and with minimum tension on the thin hinge joints 24 which should be just as thin and narrow as possible to attain a clean burr-free cut.

Alternatively to ejecting the trimmed bottle downwardly and the trimmed off scrap forwardly, the scrap may be ejected from the machine and the bottles moved forwardly into a bottle neck and mouth sizing apparatus, thus eliminating manual handling of the trimmed bottles after trimming the same from the string, and more fully automating production.

It will be understood that variations and modifications may be effected without departing from the spirit and scope of the novel concepts of this invention.

I claim:

1. In equipment for processing a string of advancing connected blow-molded plastic bottle blanks each having a trailing shoulder:
    trimming means for separating the leading blanks successively from the string;
    means for advancing the string to align the leading bottle blanks successively with said trimming means comprising:
        a bottle blank string support and detent means for engaging said trailing shoulders;
        a pawl for engaging said shoulders successively; and
        means for driving said supporting and detent means and said pawl relatively reciprocably to effect advance of the string toward said trimming means.

2. The equipment according to claim 1, said string supporting and detent means comprising a longitudinally extending trough having a series of detents therein relative to which the string of blanks is adapted to be advanced, and said pawl being operative downwardly in said trough to engage the bottle blanks successively and alternatively relative to said detents.

3. The equipment according to claim 1, comprising means supporting said pawl pivotally at a stationary location, and means supporting said supporting and detent means for reciprocable movement with respect to the pawl.

4. In equipment for processing a string of advancing connected blow-molded plastic bottle blanks each having a trailing shoulder:
    a machine frame;
    trimming means for separating the leading blanks successively from the string;
    a carriage having guide means thereon leading to said trimming means;
    means for reciprocating said carriage; and
    a pawl including means supporting it on said frame and engageable with successive trailing shoulders to advance the successive bottle blanks to said trimming means in the reciprocations of said guide means with said carriage relative to the pawl.

5. Equipment according to claim 4, including detent means located in fixed relation to said guide means and reciprocable therewith on said carriage and engageable with said trailing shoulders alternately relative to said pawl.

6. Equipment according to claim 4, wherein said trimming means comprise shearing blade structure carried by said carriage and operative in timed relation with the reciprocations of the carriage.

7. Equipment according to claim 4, wherein said trimming means include a rockably mounted shear head over said guide means on said carriage and reciprocable with the carriage, and means for rockably controlling said shear head in timed relation with reciprocations of the carriage and coordinated with advancing of the blanks in the string by action of said pawl responsive to reciprocations of the carriage.

8. In equipment for processing a string of advancing connected blow-molded plastic bottle blanks:
    trimming means for separating the leading blanks successively from the string;
    means for advancing the string to align the leading bottle blanks successively with said trimming means;
    said trimming means comprising cooperative sets of shear blades spaced apart longitudinally of the string and separable to enable positioning of the bottle blanks in the string relative thereto;
    said sets of shear blades comprising respective lower blades over and between which respective portions of the string involving the advancing endmost blank in each instance are successively supported, and cooperative upper shear blades;
    a shear head supporting said upper shear blades; and
    means mounting said head for downward movement for shearing coaction of the sets of shear blades and upward movement to clear the shear blades from one another.

9. In equipment according to claim 8, means mounting said head pivotally at one end, and trip arm means located to receive and support the opposite end of the shear head in separated open position and operable to release the shear head to close and drive the upper shear blades into trimming relation to the lower shear blades.

10. Equipment according to claim 9, comprising a reciprocable carriage mounting said trimming die means and said trip arm means, and arm means resetting and trip stops spaced apart and relative to which said carriage reciprocates.

11. Equipment according to claim 8, comprising pneumatic means mounted adjacent to and connected with said shear head and operative to effect said upward movement of the shear head.

12. Equipment according to claim 11, including a supporting frame structure, a reciprocating carriage operatively mounted on said frame structure and supporting said trimming means and said shear head, means supporting said pneumatic means on said carriage, valve means mounted on said carriage for controlling said pneumatic means, and means mounted on said frame structure for controlling operations of said valve means in the reciprocations of said carriage.

13. In equipment for processing a string of advancing connected blow-molded plastic bottle blanks:
 trimming means comprising lower shear blade means and upper shear blade means;
 pneumatically actuated means for raising said upper shear blade means relative to the lower shear blade means and operative to drive the upper shear blade means into shearing relation to the lower shear blade means;
 a reciprocable carriage mounting said shear blade means and said pneumatically actuated means;
 frame means supporting said carriage;
 means for driving the carriage reciprocably on the frame means;
 compressed air supply means for said pneumatically actuated means mounted on the carriage; and
 means mounted on the frame means for controlling operation of said supply means.

14. In equipment for processing a string of advancing connected blow-molded plastic bottle blanks:
 trimming means for separating the leading blanks successively from the string and comprising lower shear blade means and upper cooperative shear blade means;
 means for advancing the string to align the leading bottle blank successively into position to be sheared from the string by said shear blade means;
 an elongated shear head mounted longitudinally over the path of movement of the blanks and pivoted at one end and carrying said upper shear blade means adjacent to its opposite end; and
 means operative to rock said shear head about its pivot in timed relation with movement of said string of blanks to clear said upper shear blade means relative to the lower shear blade means when a leading blank is moved into position for trim-off by said shear blade means and to swing downwardly for shearing coaction of said upper shear blade means with the lower shear blade means for trimming off the positioned leading blank from the string.

15. Equipment according to claim 14, comprising a reciprocating carriage supporting said lower shear blade means and said shear head and having means operative thereon for advancing the string relative to said shear blade means by one bottle blank increment in each reciprocal cycle of the carriage.

16. Equipment according to claim 15, including means for adjusting the shear blade means and for adjusting the range of reciprocal movement of the carriage for bottle blanks of different lengths to be processed.

17. A method of handling and trimming plastic bottle blanks comprising:
 taking off a string of bottle blanks from a blow-molding machine and wherein the blanks are connected end-to-end with a substantial neck extension on each thereof having a hinge connection to the base end of the contiguous blank;
 feeding the taken-off string of blanks to trimming die means; and
 operating the trimming die means to trim the blanks successively from the string and including trimming the hinge connections cleanly from the base ends of the successive blanks, and trimming off the neck extensions of the blanks as they are successively separated from the string.

18. A method according to claim 17, comprising orienting the successive blanks to extend over and between lower shear blades of the trimming die assembly, and in coordinated relation driving upper shear blades into cooperative relation to the lower shear blades to effect said trimming.

19. A method of handling and trimming plastic bottle blanks comprising:
 taking off a string of bottle blanks from a blow-molding machine;
 feeding the taken-off string of blanks to trimming die means;
 operating the trimming die means to trim the blanks successively from the string and trimming scrap from the blanks into a trough; and
 pneumatically ejecting the scrap along the trough.

20. A method according to claim 19, including dropping the trimmed blanks away from said trough.